US008239930B2

(12) United States Patent
Hietasarka

(10) Patent No.: US 8,239,930 B2
(45) Date of Patent: Aug. 7, 2012

(54) METHOD FOR CONTROLLING ACCESS TO A NETWORK IN A COMMUNICATION SYSTEM

(75) Inventor: Juha Hietasarka, Suinula (FI)

(73) Assignee: Nokia Corporation, Espoo (FI)

(*) Notice: Subject to any disclaimer, the term of this patent is extended or adjusted under 35 U.S.C. 154(b) by 1612 days.

(21) Appl. No.: 11/585,815

(22) Filed: Oct. 25, 2006

(65) Prior Publication Data

US 2008/0104689 A1 May 1, 2008

(51) Int. Cl.
*H04L 29/06* (2006.01)

(52) U.S. Cl. ........................................ 726/13; 709/225

(58) Field of Classification Search ................ 726/2, 11, 726/13; 709/225, 229; 380/247, 248
See application file for complete search history.

(56) References Cited

U.S. PATENT DOCUMENTS

| | | | | |
|---|---|---|---|---|
| 6,976,177 | B2 * | 12/2005 | Ahonen | 726/3 |
| 7,020,464 | B2 * | 3/2006 | Bahl et al. | 455/432.1 |
| 2004/0264439 | A1 | 12/2004 | Doherty et al. | |
| 2005/0169274 | A1 | 8/2005 | Shuster | |
| 2005/0185624 | A1 * | 8/2005 | Andersen et al. | 370/338 |
| 2005/0259654 | A1 | 11/2005 | Faulk, Jr. | |
| 2005/0268335 | A1 * | 12/2005 | Le et al. | 726/13 |
| 2005/0271003 | A1 * | 12/2005 | Devarapalli et al. | 370/328 |
| 2006/0080380 | A1 * | 4/2006 | Aizu et al. | 709/203 |
| 2006/0080444 | A1 | 4/2006 | Peddemors et al. | |
| 2008/0016240 | A1 * | 1/2008 | Balandin | 709/238 |

FOREIGN PATENT DOCUMENTS

| | | |
|---|---|---|
| JP | 2006-067314 | 9/2006 |
| WO | 0126284 A1 | 4/2001 |
| WO | 0126324 A1 | 4/2001 |
| WO | WO 2005/053275 A1 | 6/2005 |

OTHER PUBLICATIONS

International Search Report.
Office Action from Chinese Patent Application No. CN 2007800377665, dated Dec. 31, 2011.

* cited by examiner

*Primary Examiner* — Gilberto Barron, Jr.
*Assistant Examiner* — Virginia T Ho
(74) *Attorney, Agent, or Firm* — Alston & Bird LLP

(57) ABSTRACT

The invention relates to a method for controlling access to a private network. To a firewall node are updated logical names for mobile nodes allowed to communicate with nodes in the private network. A packet is received to the firewall node from an external network, the packet being addressed to a first node within the private network. The source address is obtained from the packet. Addresses associated with the logical names are obtained from a database node. It is checked whether the source address belongs to the addresses obtained. The packet is admitted to the private network, if the source address belongs to the addresses obtained.

29 Claims, 4 Drawing Sheets

METHOD FOR CONTROLLING ACCESS TO A NETWORK IN A COMMUNICATION SYSTEM

BACKGROUND OF THE INVENTION

1. Field of the Invention

The invention relates to communication networks. Particularly, the invention relates to a method for controlling access to a network in a communication system.

2. Description of the Related Art

A recent trend is that domestic appliances and consumer electronics devices are equipped with increasing sophisticated remote control capabilities. Domestic appliances may be equipped with network interfaces in order to provide for remote control via a local network. For example, a personal computer connected to the local network may provide a single point of control for a wide range of domestic appliances. It may be possible to control stereos, set-top boxes and digital recorders. However, it may also be possible to control washing machines, refrigerators, warming and security systems via the personal computer. It may be conceived that schedules for activating warming and deactivating security alarms are configured via the personal computer. It would be beneficial to be able to control domestic appliances via a mobile computer or terminal, in other words, a mobile node connected to an external network such as the Internet or a wide-range Intranet. However, the address of a mobile node may vary depending on the current sub-network used to connect to the external network.

Network firewalls are used to control access to private corporate, organizational or home networks. The firewalls enable filter rules to be defined that govern access to the private network depending on the source addresses, destination addresses, source ports, destination ports and protocols. Incoming packets and connections may be allowed or dropped based on the filter rules. However, the problem with existing firewalls is that the firewall may not be configured with all the addresses that a mobile node may use to access the network protected by the firewall. This is due to the fact that it may be impossible to predict all possible sub-networks that are used to provide a point of attachment to the mobile node. It should also be noted that the allowing of a wide ranges of addresses may expose the private network to attacks from a hostile node that happens to use these addresses.

SUMMARY OF THE INVENTION

The invention relates to a method comprising: updating to a firewall node at least one logical name for at least one mobile node allowed to communicate with at least one node in a first network; receiving a packet to said firewall node from a second network, said packet being addressed to a first node within said first network; obtaining the source address from said packet; obtaining at least one address associated with said at least one logical name from a database node; checking whether said source address belongs to said at least one address obtained; and admitting said packet to a first network if said source address belongs to said at least one address obtained.

The invention relates also to a system comprising: a firewall node configured to communicate with a first network and a second network, to store at least one logical name for at least one mobile node allowed to communicate with at least one node in the first network, to receive a packet from the second network, said packet being addressed to a first node within said first network, to obtain the source address from said packet, to obtain at least one address associated with said at least one logical name from a database node, to check whether said source address belongs to said at least one address obtained and to admit said packet to said first network if said source address belongs to said at least one address obtained.

The invention relates also to a network node comprising: a communication entity configured to communicate with a first network and a second network and to receive a packet from the second network, said packet being addressed to a first node within said first network; and a filtering entity configured to store at least one logical name for at least one mobile node allowed to communicate with at least one node in the first network, to obtain the source address from said packet, to obtain at least one address associated with said at least one logical name from a database node, to check whether said source address belongs to said at least one address obtained and to admit said packet to said first network if said source address belongs to said at least one address obtained.

The invention relates also to a network node comprising: means for storing at least one logical name for at least one mobile node allowed to communicate with at least one node in a first network; means for receiving a packet from a second network, said packet being addressed to a first node within said first network; means for obtaining the source address from said packet; means for obtaining at least one address associated with said at least one logical name from a database node; means for checking whether said source address belongs to said at least one address obtained; and means for admitting said packet to said first network if said source address belongs to said at least one address obtained.

The invention relates also to a mobile node comprising: a communication entity configured to communicate with a communication network and to receive a packet from the communication network, said packet being addressed to the mobile node; and a filtering entity configured to store at least one logical name for at least one remote mobile node allowed to communicate with the mobile node, to obtain the source address from said packet, to obtain at least one address associated with said at least one logical name from a database node, to check whether said source address belongs to said at least one address obtained and to admit said packet if said source address belongs to said at least one address obtained.

The invention relates also to a mobile node comprising: means for communicating with a communication network; means for receiving a packet from the communication network, said packet being addressed to the mobile node; means for storing at least one logical name for at least one remote mobile node allowed to communicate with the mobile node; means for obtaining at least one address associated with said at least one logical name from a database node; means for checking whether said source address belongs to said at least one address obtained; means for admitting said packet if said source address belongs to said at least one address obtained.

The invention relates also to a computer program comprising code adapted to perform the following steps when executed on a data-processing system: storing at least one logical name for at least one mobile node allowed to communicate with at least one node in a first network; receiving a packet from a second network, said packet being addressed to a first node within said first network; obtaining the source address from said packet; obtaining at least one address associated with said at least one logical name from a database node; checking whether said source address belongs to said at least one address obtained; and admitting said packet to said first network if said source address belongs to said at least one address obtained.

In one embodiment of the invention, the communication entity and the network interface in a network node are configured to communicate with a first network and a second network. A network node comprising a filtering entity may be referred to as a firewall node. A filtering entity in the network node is configured to store at least one logical name for at least one mobile node allowed to communicate with at least one node in the first network. The communication entity is configured to receive a packet from the second network, said packet being addressed to a first node within said first network. The communication entity provides the first packet to the filtering entity. The filtering entity obtains the source address from said packet. The filtering entity obtains at least one address associated with said at least one logical name from a database node. Thereupon, the filtering entity checks whether said source address belongs to said at least one address obtained and admitting said packet to the first network, if said source address belongs to said at least one address obtained. The admitting comprises that the communication entity sends the packet to the first network.

In one embodiment of the invention, the system further comprises the firewall node comprising the filtering entity configured to categorize said packet based on at least one header field in said packet and to perform said obtaining of at least one address associated with said at least one logical name in response to the packet belonging to at least one predefined category. The categories may be formed based on a protocol identifier, addresses and port numbers in a received packet.

In one embodiment of the invention, said first network comprises an Internet Protocol network and said second network comprises an Internet Protocol network. The first and the second networks may be IPv4 or IPv6 networks. IPv6 may be carried over IPv4 or vice versa.

In one embodiment of the invention, said database node comprises a Domain Name System server. The Domain Name System server may consult a number of other servers while resolving a logical name into an address or vice versa. Another server consulted may further consult yet another server and so on.

In one embodiment of the invention, said database node comprises a server providing a Distributed Hash Table.

In one embodiment of the invention, said mobile node is a mobile station and said second network comprises a mobile communication system. In one embodiment of the invention, said packet comprises a connection establishment request, for example, a Transmission Control Protocol (TCP) synchronization segment.

In one embodiment of the invention, said system comprises a mobile communication network. In one embodiment of the invention, said mobile node comprises a mobile station or generally a mobile terminal. In one embodiment of the invention, the system comprises at least one of a Global System of Mobile Communications (GSM) network and a Universal Mobile Telephone System (UMTS) network. The mobile node may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, holographic memory, optical disk or magnetic tape.

The embodiments of the invention described hereinbefore may be used in any combination with each other. Several of the embodiments may be combined together to form a further embodiment of the invention. A method, a system, a network node or a computer program to which the invention is related may comprise at least one of the embodiments of the invention described hereinbefore.

The benefits of the invention are related to improved security and better access to private networks.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
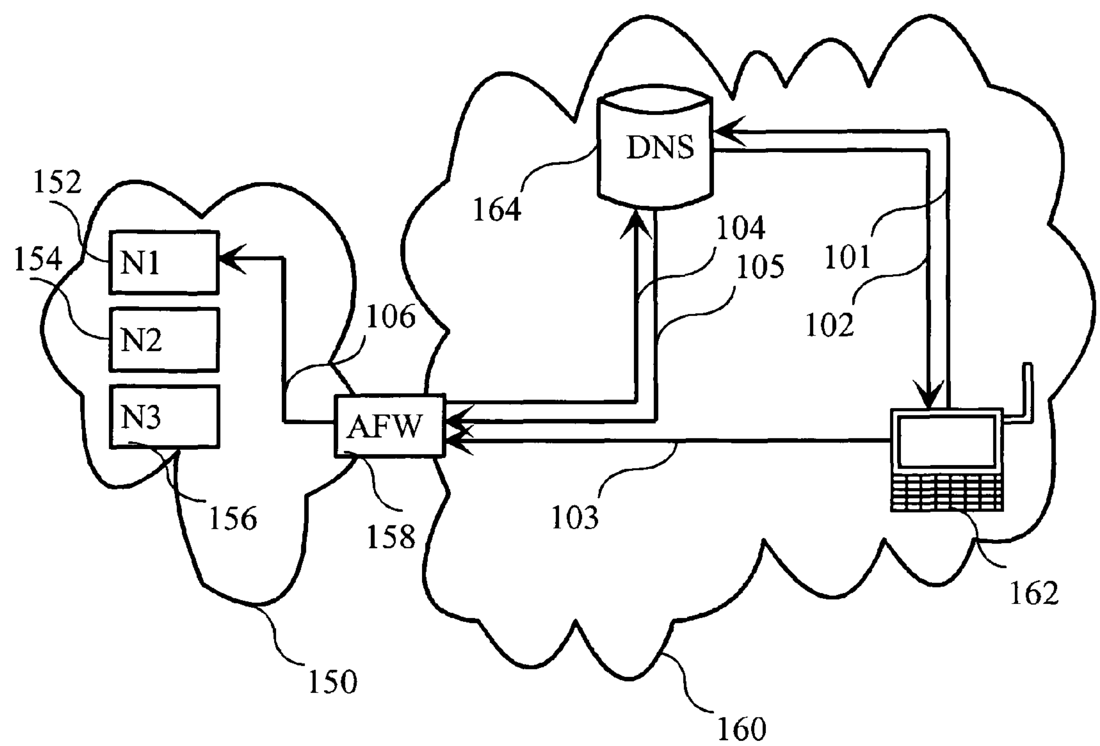
FIG. 1 is a block diagram illustrating the accessing of a node in a first network via a second network and a firewall in one embodiment of the invention.

FIG. 1 is a block diagram illustrating the accessing of a node in a first network via a second network and a firewall in one embodiment of the invention. In FIG. 1 there is a first network 150 and a second network 160. The networks 150 and 160 may be, for example, packet switched networks or circuit switched networks. Networks 150 and 160 use, for example, the Internet Protocol (IP) for communication. First network 150 may, for example, be a private network and second network 160 may, for example, be a public network or an external network. Networks 150 and 160 may comprise any number of nodes. It should be noted that by a first network is herein meant any network to which access is controlled via a traffic filter node. In this sense a first network may be owned and operated by any number of persons or legal persons. The same concerns also second network 160. In FIG. 1 there is an Advanced Firewall (AFW) node 158 which acts as a traffic filter node. AFW 158 is connected to both first network 150 and second network 160. In first network 150 there are nodes 152, 154 and 156. Nodes 152, 154 and 156 may be, for example, computer nodes that control a domestic appliance or a media device either directly or indirectly via at least one intermediate node (not shown). In second network 160 there is a name server 164, which provides mapping between logical names and network addresses. Name server 164 may also provide inverse mapping from network addresses to logical names. Name server 164 may also consult any number of other name servers (not shown) in order to resolve a logical name to a network address. Name server 164 and the other name servers consulted may be implemented, for example, using the Domain Name System (DNS) or a Distributed Hash Table (DHT). In FIG. 1 there is also a mobile node 162. Mobile node may be attached to a sub-network (not shown) within second network 160. The sub-network may comprise, for example, a Global System of Mobile Communications (GSM) network and a Universal Mobile Telephone System (UMTS) network which provide packet switched connectivity via gateway nodes. The sub-network may also comprise a Wireless Local Area Network (WLAN) or a wired Local Area Network (LAN). Access for mobile node 162 may also be provided via a subscriber line to an access server within the sub-network.

The starting point in FIG. 1 is that mobile node 162 has established access to second network 160 via a new point of attachment. Mobile node 162 has therefore obtained a new network address. In order to be reachable with a logical name, mobile node 162 sends an address update message to name server 164 as illustrated with arrow 101. The address update message comprises a logical name of mobile node 162, the new address and may comprise credentials. The credentials comprise, for example, a crypto-graphically formed value. The value has been formed, for example, by forming a message digest of at least part of the fields in the update message. The message digest is then encrypted with the private key of the mobile node. In one embodiment of the invention, mobile node 162 may also be authenticated by name server 164. Name server 164 may acknowledge the address update to mobile node 162 as illustrated with arrow 102.

At a later time, mobile node 162 detects a need to issue a request message to node 152, which belongs to first network 150. The request message may be a transport connection request or a single datagram. The request message may be associated with a home appliance function controlled by node 152. The need may be detected based on a user action on the user interface of mobile node 162, which is translated by software in mobile node 162 to a request pertaining to node 152. The need may be also detected based on a timer or any automatic threshold. A name for node 152 may be resolved into a network address by mobile node 162 using, for example, the DNS. Mobile node 162 sends the request message towards node 152 as illustrated with arrow 103. The request message is routed in second network 160 first to AFW 158. Upon receiving the request message, AFW 158 may determine that the request message belongs to a category of messages, which require the checking of currently allowed external node addresses. The currently allowed external node addresses comprise the addresses registered for the logical names associated with the mobile nodes allowed to communicate with nodes within first network 150. There may one or many logical names associated with one or many mobile node. The category of a message is determined, for example, based on the destination port number. The category may also be determined using any parameter foreseen in a message to be received. In order to determine the currently allowed external node addresses, AFW 158 sends at least one address request message to name server 164 as illustrated with arrow 104. The at least one address request message comprise an address request message for each logical name associated with a mobile node allowed for first network 150. Name server 164 translates the logical names to network addresses and returns at least one address response message to AFW 158 as illustrated with arrow 105. The logical names for mobile nodes allowed for first network 150 are determined, for example, using a user interface within AFW 158. The logical names may also be obtained from an external register (not shown) with a unique identifier associated with a user of first network 150. Such a unique identifier may be, for example, a social security number or a full name. The addresses from the response messages are gathered to a list of allowed addresses. If the source address in the request message 103 belongs to the listed of allowed addresses, AFW 158 sends the request message 103 towards node 152 in first network 150, as illustrated with arrow 106. If the source address does not belong to the listed allowed addresses, the request message 103 is ignored and an attack attempt may be recorded to a log file and an intrusion alert may be raised.

In one embodiment of the invention, mobile node 162 may issue an update indication message to AFW 158 after mobile node 162 has obtained a new network address. The update indication message tells AFW 158 to obtain the list of the address associated with the logical names associated with the mobile nodes allowed to communicate with nodes within first network 150. AFW 158 obtains the list by sending name resolution queries to name server 164 for each logical name. Multiple name resolution queries for different logical names may be comprised in a single query message. Upon obtaining the list, AFW 158 updates its copy of the list of allowed addresses. In one embodiment of the invention, AFW 158 deletes the list within a specified time from the obtaining of the list. Thereupon, when mobile node 162 detects a need to send a request message to node 152 it sends a packet to AFW 158 comprising the request message. If AFW 158 finds the address of mobile node 162 in its local copy of address allowed, there is no need to perform the query of name server 164. Thus certain amount of time associated with the query to name server 164 may be spared.

Figure 2:
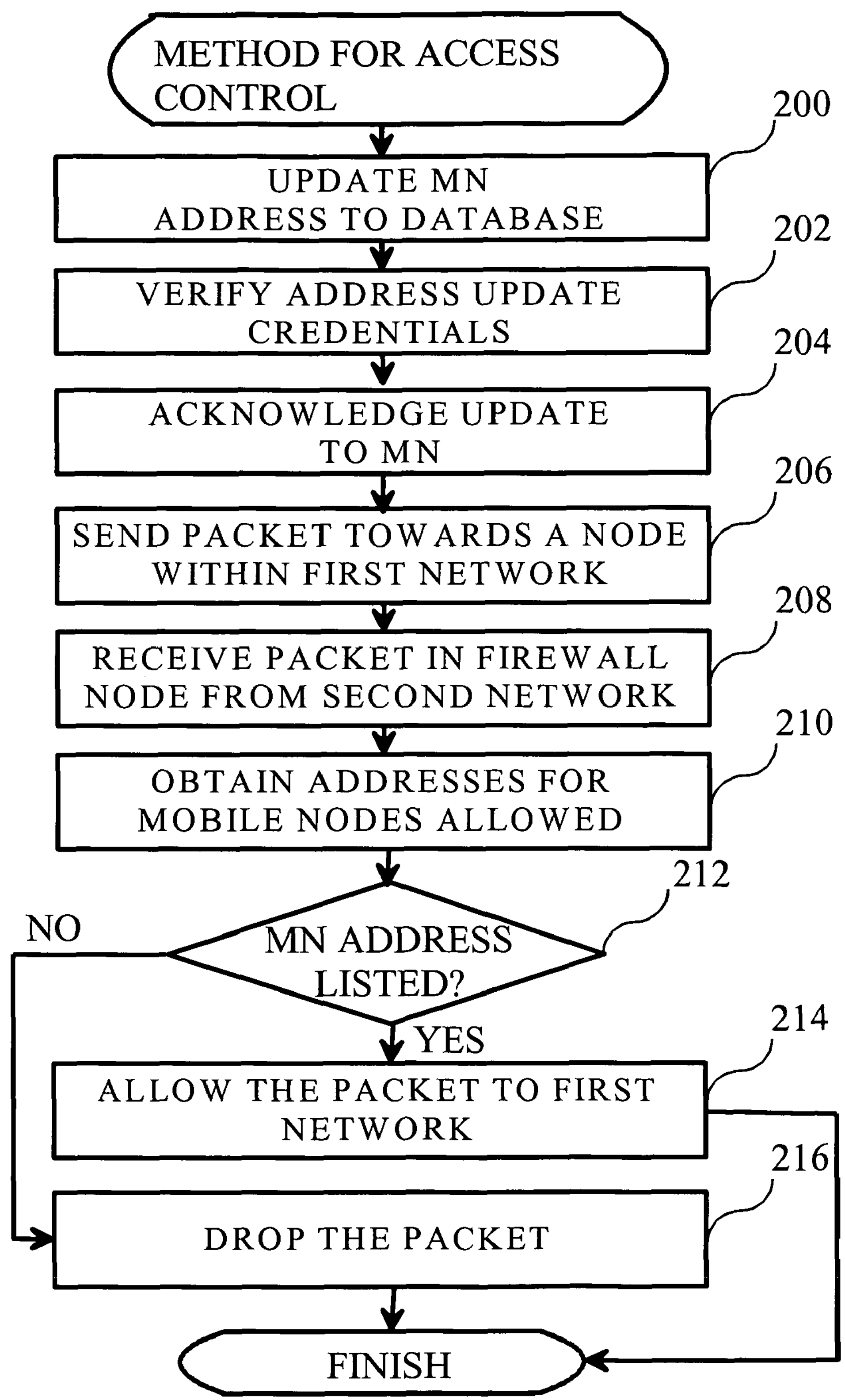
FIG. 2 is a flow chart illustrating a method for controlling access to a network in one embodiment of the invention.

FIG. 2 is a flow chart illustrating a method for controlling access to a network in one embodiment of the invention.

At step 200 the current address of a mobile node is updated to a database by the mobile node. The address update is due to the obtaining of a new address for the mobile node within a second network, for example, an external network. The database may be stored in a name server node within the second network. Thus, the address update may comprise sending a message from the mobile node to the name server node.

At step 202 the database may verify the credentials in the address update request. If the credentials do not match the update may be rejected.

At step 204 the address update may be acknowledged from the database to the mobile node.

At step 206 the mobile node detects a need to send a packet comprising a message to a second node within a first network. Thus, the mobile node sends the packet comprising the message towards the second node. The second network routes the packet towards the first network.

At step 208 the packet is received in a firewall node connected to the second network and the first network.

At step 210 the firewall node obtains the addresses for the mobile nodes allowed to communicate via a second network with nodes within the first network. A mobile node allowed is specified for the firewall node with at least one logical name associated with the mobile node. In one embodiment of the invention, there may be only one mobile node allowed. In one embodiment of the invention, more than one mobile node is allowed.

At step 212 the firewall node checks if the source address for the packet received may be found in the list of addresses allowed to communicate with nodes within the first network. If the mobile node address is not found in the list the method continues at step 216. Otherwise, the method continues at step 214.

At step 214 the packet is sent by the firewall node towards the second node via the first network.

At step 216 the packet is discarded and an intrusion alert may be issued and the intrusion may be logged to a log file.

Figure 3:
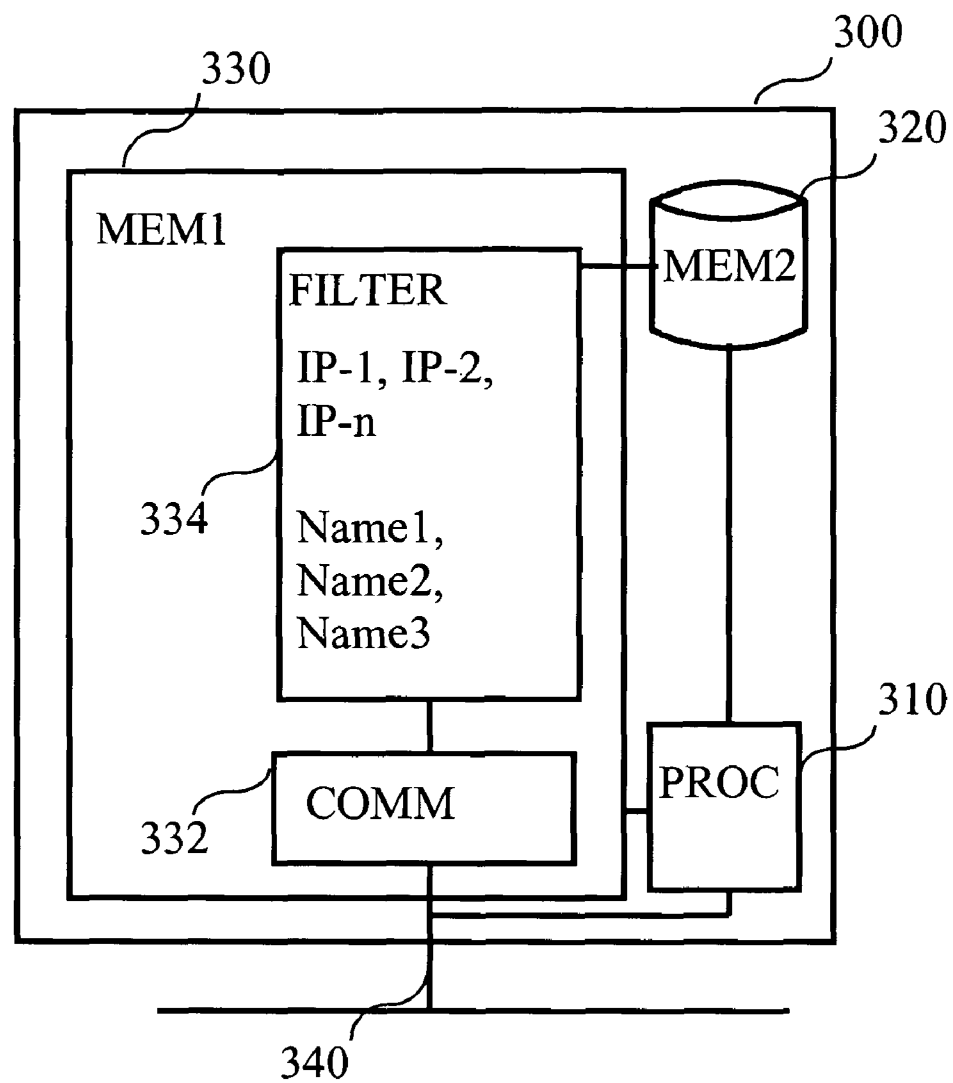
FIG. 3 is a block diagram illustrating a firewall node in one embodiment of the invention.

FIG. 3 is a block diagram illustrating a firewall node in one embodiment of the invention.

In FIG. 3 there is a firewall node 300. Firewall node 300 comprises a processor 310, a primary memory 330 a secondary memory 320 and a network interface 340. The secondary memory may be for example a hard disk, a flash memory, holographic memory or an optic disk. When processor 310 is executing firewall node functionality primary memory 330 comprises a filtering entity 334 and a communication entity 332. Communication entity 332 comprises the network layer functions, for example, the Internet Protocol (IP) functions and link layer functions. The network interface 340 which may be for example a Local Area Network interface, Wireless Local Network interface, a Wide Area Network interface or a mobile communication system radio interface. Filtering entity 334 comprises and maintains a data structure storing the list of source addresses allowed to send request messages to node within a first network to which filtering entity 334 controls access. Filtering entity 334 also comprises a data structure storing the list of logical names associated with a mobile node or a number of nodes which are allowed to communicate with nodes within a given first network. Firewall node 300 may also be a mobile node, for example, a mobile station operating in a mobile communication system such as the GSM or the UMTS.

In one embodiment of the invention, communication entity 332 is comprised in the operating system of firewall node 300. The entities within network node 300 in FIG. 3, such as filtering entity 334 and communication entity 332 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 3 may also be stored in separate memories and executed by separate processors, which communicate, for example, via a message bus or an internal network within the network node. An example of such a message bus is the Peripheral Component Interconnect (PCI) bus.

Figure 4:
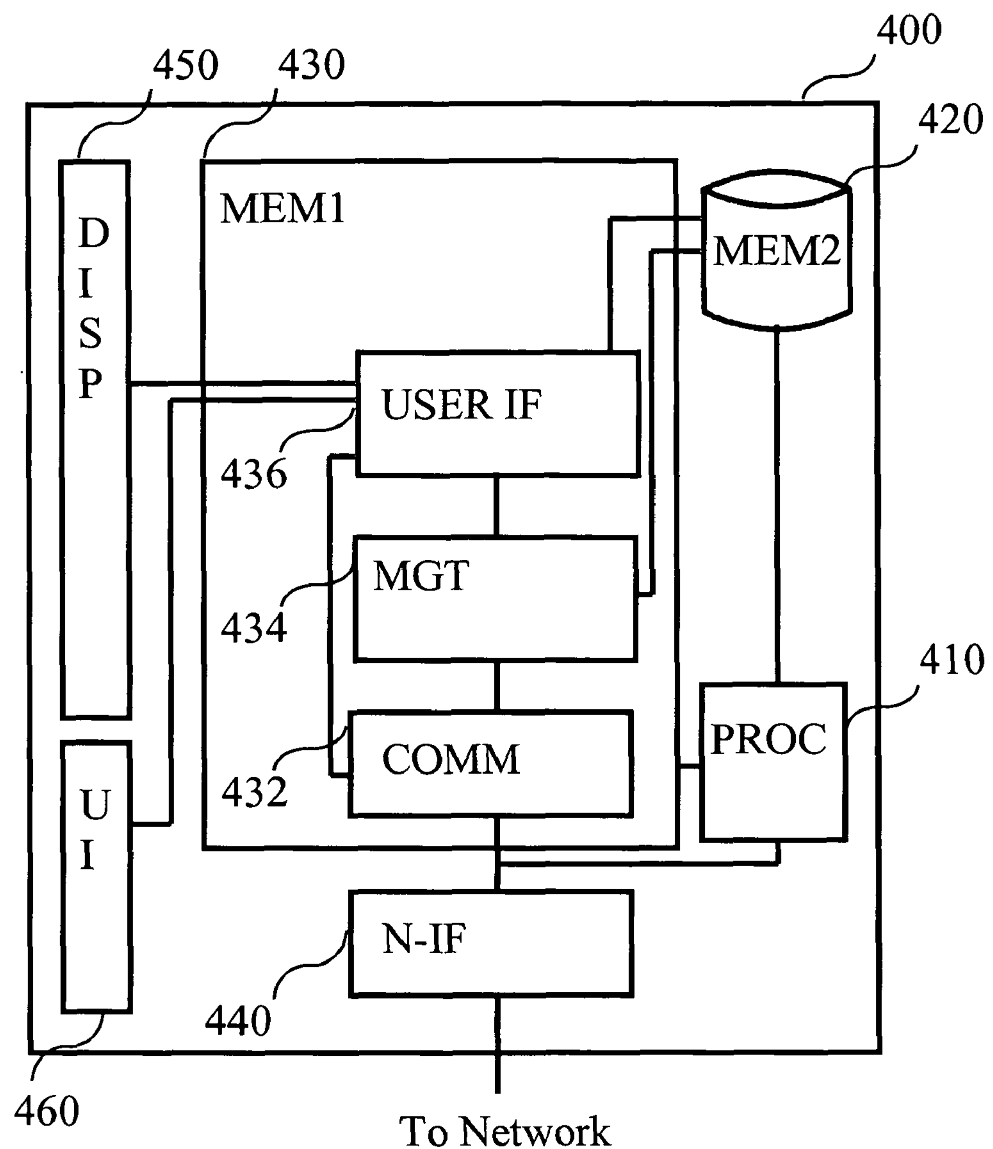
FIG. 4 is a block diagram illustrating a mobile node in one embodiment of the invention.

FIG. 4 is a block diagram illustrating a mobile node in one embodiment of the invention.

In FIG. 4 there is a mobile node 400. Mobile node 400 comprises a processor 410, a primary memory 430 a secondary memory 420, a network interface unit 440 and a display unit 450. The secondary memory may be for example a hard disk, a flash memory, a holographic memory or an optic disk. When processor 410 is executing mobile node functionality primary memory 430 comprises a user interface entity 436, management entity 434 and a communication entity 432. Communication entity 332 comprises the network layer functions, for example, the Internet Protocol (IP) functions and link layer functions. The network interface 440 may be, for example, a radio interface, a Local Area Network (LAN) interface, Wireless Local Area Network (WLAN) interface or a Wide Area Network (WAN) interface. The network interface may also comprise an antenna. The management entity 434 performs all remote appliance management related functions and sends remote appliance management related messages to remote nodes, for example, in a private network which might be network 150 in FIG. 1. Management entity 434 may provide via user interface entity 436 a user interface for managing at least one remote appliance, for example, a home appliance or device. User interface entity 436 may provide a dialog comprising, for example, a variety of user interface objects displayed using display unit 450 that are controlled with user interaction device 460 comprising, for example, a keypad, a keyboard, mouse or any other pointer device. The user interface object may comprise, for example, menus, icons, text entry boxes, buttons, windows, scrollers and lists.

In one embodiment of the invention, communication entity 432 is comprised in the operating system of mobile node 400. The entities within mobile node 400 in FIG. 4, such as management entity 434, user interface entity 436 and communication entity 432 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity.

In one embodiment of the invention, mobile node 400 also comprises the functions of firewall node 300. In such a case filtering entity 334 controls access and it admits packets for further processing in mobile node 400.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:

updating at a firewall node at least one logical name for at least one mobile node allowed to communicate with at least one node in a first network;

receiving a packet at said firewall node from a second network, said packet being addressed to a first node within said first network;

obtaining the source address from said packet;

causing, responsive to receiving the packet, at least one address associated with said at least one logical name to be obtained from a database node;

checking whether said source address matches said at least one obtained address; and admitting said packet to said first network if said source address matches said at least one obtained address.

2. The method according to claim 1, the method further comprising:

causing obtainment of a new address for said mobile node in said second network; and causing the new address of said mobile node and a logical name of said mobile node to be sent to said database node in a message.

3. The method according to claim 2, the method further comprising:

performing data origin authentication for said message by said database node;

updating the new address at the database node; and causing acknowledgement of the update to said mobile node.

4. The method according to claim 2, the method further comprising:

causing an indication message to be sent from said mobile node to said firewall node, said indication message indicating said updating of the new address to the database node; and causing obtainment at said firewall node of at least one address associated with said at least one logical name from said database node in response to the receiving of said indication message.

5. The method according to claim 1, the method further comprising:

receiving said packet in said first network node;

causing obtainment of configuration information associated with at least one object identified in said packet; and configuring a home appliance based on said configuration information and information provided in said packet.

6. The method according to claim 1, the method further comprising:

categorizing said packet based on at least one header field in said packet; and performing causing at least one address associated with said at least one logical name to be obtained in response to the packet belonging to at least one predefined category.

7. The method according to claim 1, wherein said first network comprises an Internet Protocol network and said second network comprises an Internet Protocol network.

8. The method according to claim 1, wherein said database node comprises a Domain Name System server.

9. The method according to claim 1, wherein said database node comprises a server providing a Distributed Hash Table.

10. The method according to claim 1, wherein said mobile node is a mobile station and said second network comprises a mobile communication system.

11. The method according to claim 1, wherein said packet comprises a connection establishment request.

12. The method according to claim 1, wherein the first network comprises a second mobile device and the method is used to control access to the first network.

13. The method according to claim 1, wherein the at least one logical name updated at the firewall node comprises at least one Domain Name System (DNS) name, and wherein the database node comprises a DNS server.

14. A system comprising:

a firewall node; and a database node;

wherein the firewall node is configured to communicate with a first network and a second network, to store at least one logical name for at least one mobile node allowed to communicate with at least one node in the first network, to receive a packet from the second network, said packet being addressed to a first node within said first network, to obtain the source address from said packet, to obtain, responsive to receiving the packet at least one address associated with said at least one logical name from the database node, to check whether said source address matches said at least one obtained address, and to admit said packet to said first network if said source address matches said at least obtained one address.

15. The system according to claim 14, the system further comprising:

a mobile node configured to obtain a new address in said second network, to send the new address of said mobile node and a logical name of said mobile node to a database node in a message, to detect a need to send the packet to said first node and to send said packet; and said database node configured to perform data origin authentication for said message, to update the new address and to acknowledge the update to said mobile node.

16. The system according to claim 15, the system further comprising:

said mobile node configured to send an indication message from said mobile node to said firewall node, said indication message indicating said updating of the new address to the database node; and said firewall node configured to obtain at least one address associated with said at least one logical name from said database node in response to the receiving of said indication message.

17. The system according to claim 14, the system further comprising:

at least one home appliance;

said first network node configured to receive said packet, to obtain configuration information associated with at least one object identified in said packet and to configure said at least one home appliance based on said configuration information and information provided in said packet.

18. An apparatus comprising at least one processor and at least one memory storing computer program code, wherein the at least one memory and stored computer program code are configured, with the at least one processor, to cause the apparatus to at least:

cause storage of at least one logical name for at least one mobile node allowed to communicate with at least one node in a first network;

receive a packet from a second network, said packet being addressed to a first node within said first network;

obtain the source address from said packet;

cause, responsive to receipt of the packet, at least one address associated with said at least one logical name to be obtained from a database node;

check whether said source address matches said at least one obtained address; and admit said packet to said first network if said source address matches said at least one obtained address.

19. An apparatus comprising:

means for causing storage of at least one logical name for at least one mobile node allowed to communicate with at least one node in a first network;

means for receiving a packet from a second network, said packet being addressed to a first node within said first network;

means for obtaining the source address from said packet;

means for causing, responsive to receiving the packet, at least one address associated with said at least one logical name to be obtained from a database node;

means for checking whether said source address matches said at least one obtained address; and means for admitting said packet to said first network if said source address matches said at least one obtained address.

20. An apparatus comprising at least one processor and at least one memory storing computer program code, wherein the at least one memory and stored computer program code are configured, with the at least one processor, to cause the apparatus to at least:

cause obtainment of a new address of the apparatus in a second network;

cause the new address of the apparatus and a logical name of the apparatus to be sent to a database node in a message;

cause an indication message to be sent to a firewall node, said indication message indicating said updating of the new address to the database node;

detect a need to send a request message to a remote node behind the firewall node in a first network; and cause a packet comprising said request message to be sent for routing towards the remote node via said second network.

21. An apparatus comprising:

means for causing obtainment of a new address of a mobile node in a second network;

means for causing the new address of the mobile node and a logical name of said mobile node to be sent to a database node in a message;

means for causing an indication message to be sent to a firewall node, said indication message indicating said updating of the new address to the database node;

means for detecting a need to send a request message to a remote node behind the firewall node in a first network; and means for causing a packet comprising said request message to be sent for routing towards the remote node.

22. An apparatus comprising at least one processor and at least one memory storing computer program code, wherein the at least one memory and stored computer program code are configured, with the at least one processor, to cause the apparatus to at least:

receive a packet from a communication network, said packet being addressed to the apparatus;

cause storage of at least one logical name for at least one remote mobile node allowed to communicate with the apparatus;

obtain the source address from said packet;

cause, responsive to receipt of the packet, at least one address associated with said at least one logical name to be obtained from a database node;

check whether said source address matches said at least one obtained address; and admit said packet if said source address matches said at least one obtained address, wherein the apparatus comprises or is embodied on a mobile node.

23. An apparatus comprising:

means for receiving a packet from a communication network, said packet being addressed to the apparatus;

means for causing storage of at least one logical name for at least one remote mobile node allowed to communicate with the apparatus;

means for causing, responsive to receiving the packet, at least one address associated with said at least one logical name to be obtained from a database node;

means for checking whether a source address of the received packet matches said at least one obtained address; and means for admitting said packet if said source address matches said at least one obtained address, wherein the apparatus comprises or is embodied on a mobile node.

24. A computer program product comprising at least one non-transitory computer readable medium storing code configured to cause an apparatus to perform at least the following operations when executed on the apparatus:

causing storage of at least one logical name for at least one mobile node allowed to communicate with at least one node in a first network;

receiving a packet from a second network, said packet being addressed to a first node within said first network;

obtaining the source address from said packet;

causing, responsive to receiving the packet, at least one address associated with said at least one logical name to be obtained from a database node;

checking whether said source address matches said at least one obtained address; and admitting said packet to a second network if said source address matches said at least one obtained address.

25. The computer program product according to claim 24, wherein said computer readable medium is a removable memory card.

26. The computer program product according to claim 24, wherein said computer readable medium is a magnetic or an optical disk.

27. A computer program product comprising at least one non-transitory computer readable medium storing code configured to cause an apparatus to perform at least the following operations when executed on the apparatus:

causing obtainment of a new address of a mobile node in a second network;

causing the new address of the mobile node and a logical name of said mobile node to be sent to a database node in a message;

causing an indication message to be sent to a firewall node, said indication message indicating said updating of the new address to the database node;

detecting a need to send a request message to a remote node behind the firewall node in a first network; and causing a packet comprising said request message to be sent for routing towards the remote node.

28. The computer program product according to claim 27, wherein said computer readable medium is a removable memory card.

29. The computer program product according to claim 27, wherein said computer readable medium is a magnetic or an optical disk.

* * * * *